United States Patent [19]

Plapp et al.

[11] Patent Number: 4,634,000
[45] Date of Patent: Jan. 6, 1987

[54] VAPOR PHASE PROCESSING SYSTEM

[75] Inventors: Nile E. Plapp, Bloomington; Ray W. Willett, Minneapolis, both of Minn.

[73] Assignee: Centech Corporation, Minneapolis, Minn.

[21] Appl. No.: 745,707

[22] Filed: Jun. 17, 1985

[51] Int. Cl.$^4$ .............................................. B65G 17/18
[52] U.S. Cl. ..................................... 198/800; 34/77; 34/78; 34/236
[58] Field of Search ................... 34/77, 78, 236, 242; 198/342, 800, 797

[56] References Cited

U.S. PATENT DOCUMENTS

| | | | |
|---|---|---|---|
| Re. 30,399 | 9/1980 | Ammann et al. | 228/180 |
| 4,055,217 | 10/1977 | Chu et al. | 168/1 |
| 4,077,467 | 3/1978 | Spigarelli | 165/105 |
| 4,122,611 | 10/1978 | Marchal et al. | 34/242 |
| 4,389,797 | 6/1983 | Spigarelli et al. | 34/78 |
| 4,394,802 | 7/1983 | Spigarelli et al. | 34/27 |
| 4,493,414 | 1/1985 | Nevo-Hacohen | 198/800 |

*Primary Examiner*—Larry I. Schwartz
*Attorney, Agent, or Firm*—Wayne A. Sivertson

[57] ABSTRACT

A vapor phase processing system includes a vessel providing a processing chamber in which a two-phase treatment fluid bath is present. A conveyor for moving flat circuit boards on horizontal pallets down into, through and up out of the vapor phase of this treatment fluid includes two pairs of parallel rails. A first pair of rails supports a front end portion of each pallet and a second pair of rails supports a rear end portion thereof. Downward sections of each pair are parallel with downward sections of the other pair; and upward sections of each pair are parallel with upward sections of the other pair. These mutually parallel sections are spaced apart by the distance between the front and rear pallet supports. This results in the pallets and the circuit boards on them remaining horizontal while passing through the processing chamber. Any liquid treatment fluid adhering to the pallets and circuit boards when they emerge from the vapor phase of the treatment fluid or condensing in the tunnels flows from the tunnels back into the processing chamber. Any vapor phase of the treatment fluid which reaches the tunnels is recaptured by an induced air flow scavenger system which draws air and such vapor phase fluid from the tunnels and into an auxiliary tank where the fluid is condensed and the purified air evacuated.

2 Claims, 7 Drawing Figures

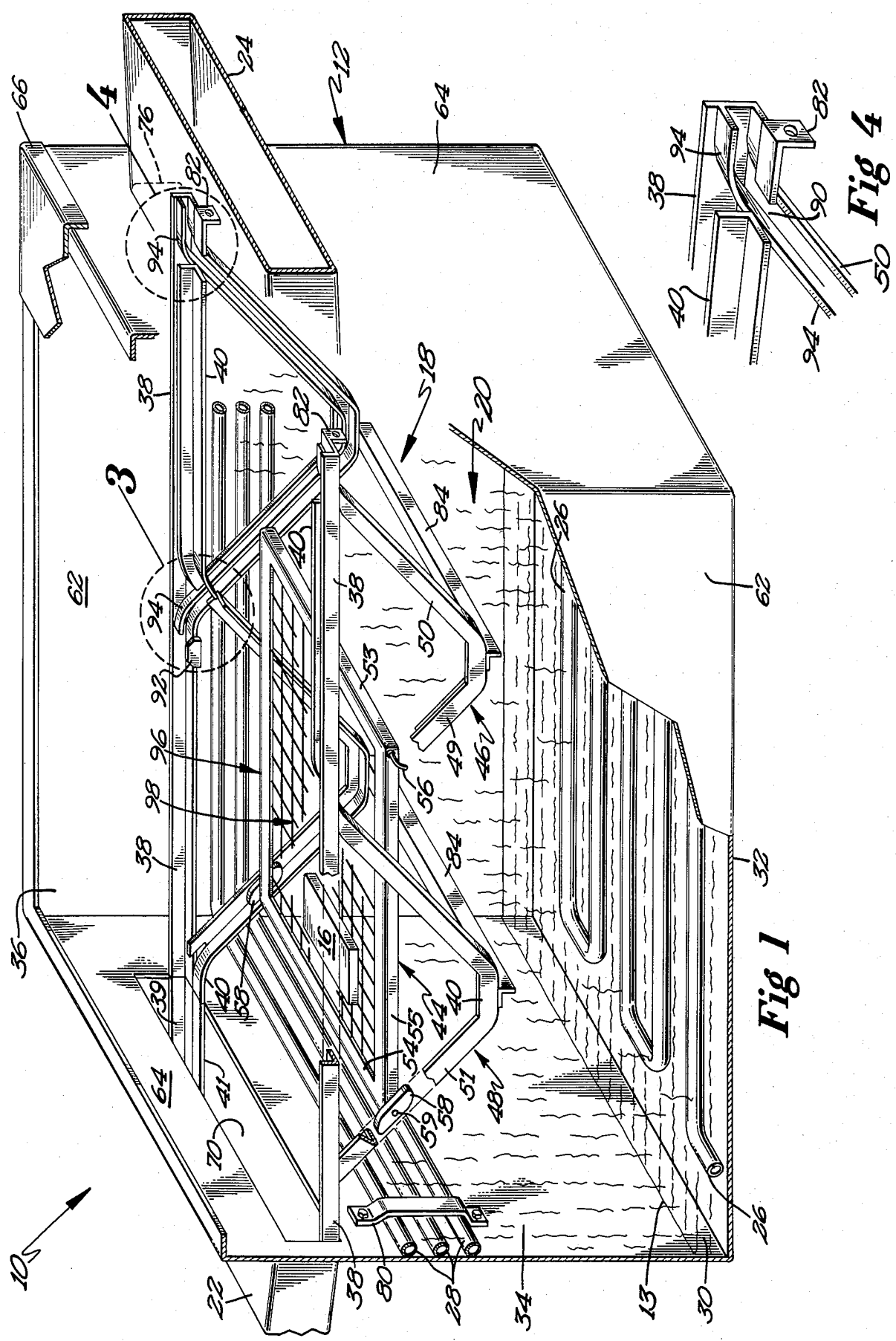

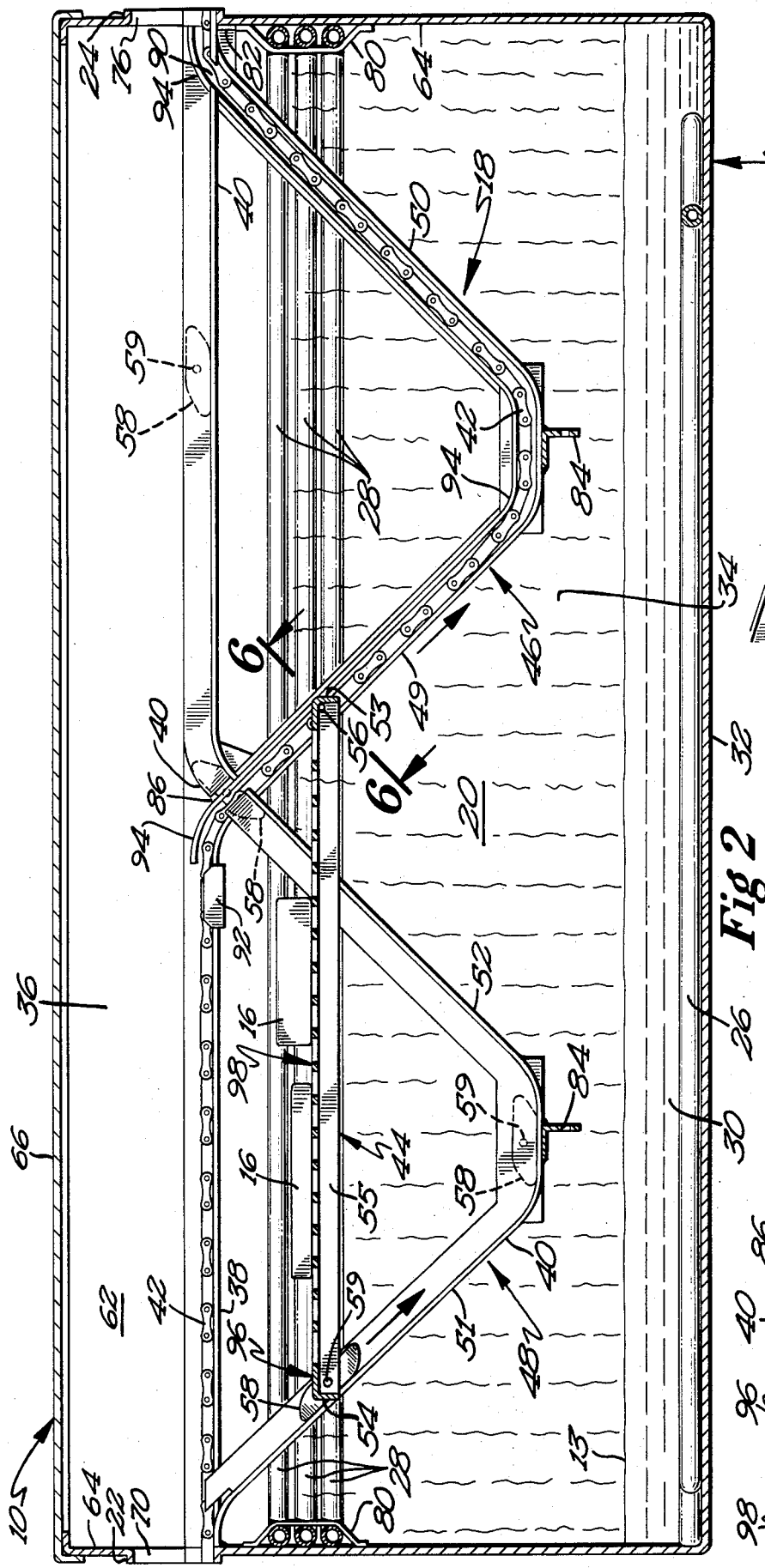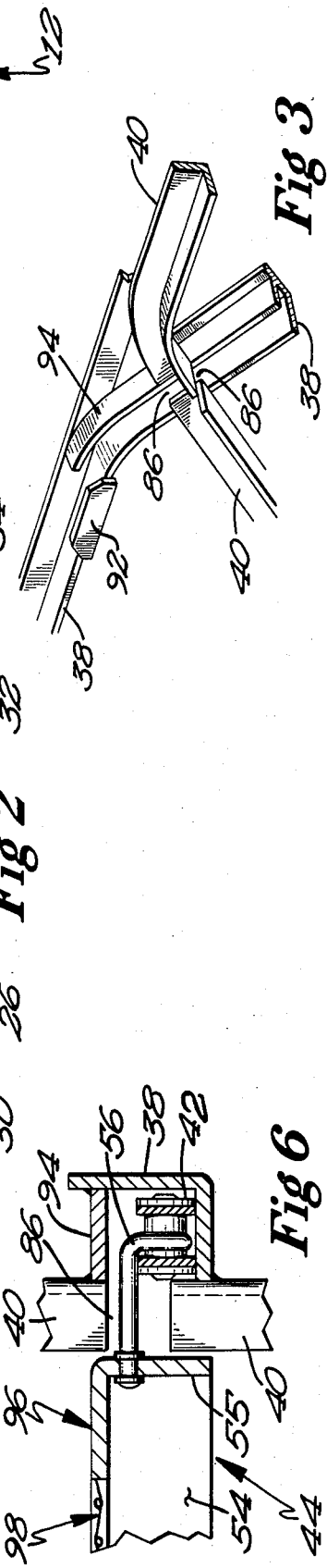

VAPOR PHASE PROCESSING SYSTEM

BACKGROUND OF THE INVENTION

1. Field of the Invention

The present invention relates generally to an apparatus which uses a vaporized processing fluid to heat a workpiece to a preselected temperature, and particularly to a vapor phase soldering system which heats a workpiece such as a circuit board with a vaporized processing fluid to reflow solder carried by the workpiece.

2. Description of the Prior Art

Vapor phase soldering systems are known in the prior art. Typically, a processing, treatment or working fluid having a heavier-than-air vapor phase is heated to its boiling point in a chamber of a vessel. The chamber is open to the atmosphere through openings in the wall of the vessel to facilitate movement of a workpiece, such as a circuit board, therethrough. Solder on the workpiece is heated to above its melting point by the vapor phase of the working fluid to melt or reflow the solder on the circuit board. When the circuit board is conveyed out of the chamber, the solder solidifies, permanently connecting the electrical elements to the circuit board. U.S. Pat. No. 4,389,797 granted June 28, 1983 to Spigarelli et al.; U.S. Pat. No. Re. 30,399 granted Sept. 9, 1980 to Ammann et al.; U.S. Pat. No. 4,394,802 granted July 26, 1983 to Spigarelli; U.S. Pat. No. 4,055,217 granted Oct. 25, 1977 to Chu et al., and U.S. Pat. No. 4,077,467 granted Mar. 7, 1978 to Spigarelli are representative of this type of vapor phase processing system.

One disadvantage of these prior art systems is that the processing vapor escapes from the vessel chamber through the openings in the walls of the vessel through which the circuit board is conveyed. Release of the processing vapor into the atmosphere is both expensive, due to the high cost of most processing vapors, and poses a health risk.

To minimize vapor loss, the vapor processing system disclosed in U.S. Pat. No. 4,389,797 to Spigarelli et al. utilizes elongated first and second conduits in communication with the chamber of the vessel, through which the workpiece enters and exits the chamber. Cooling coils are provided along the length of the conduit to condense and recover the processing fluid before it escapes into the atmosphere. However, cooling the vapor within the first and second conduits will tend to cause the vapor to condense on the workpiece itself. Thus, the processing liquid is still carried out of the chamber and the workpiece will have to be cleaned after processing to remove the processing fluid.

U.S. Pat. No. Re. 30,399 to Ammann et al. shows apparatus which utilizes substantially vertically oriented inlet and outlet openings to the vapor processing chamber, through which the workpiece enters and exits the chamber. Cooling coils are disposed within the inlet and outlet openings to prevent the vapor from being released into the atmosphere. Again, the vapor can condense on and be carried away by the workpiece. Further, the circuit board or other workpiece is carried into and out of the chamber of the vessel at an angle. This movement of the circuit board out of a horizontal orientation during melting or reflow adversely affects the finished product.

The apparatus shown in U.S. Pat. No. 4,394,802 to Spigarelli retains the processing vapor within the chamber of a vessel by creating a counter-convection flow which opposes an outward convection flow of the processing vapor from an opening in the vessel. This apparatus can only be used for treating workpieces which can be lowered vertically into the vessel and hoisted vertically from it.

U.S. Pat. No. 4,055,217 to Chu et al. shows a system which utilizes a blanket of secondary vapor disposed intermediate a hot primary vapor and the atmosphere. The secondary vapor acts on the primary vapor to condense it, preventing loss of the primary vapor to the atmosphere. This system, like Spigarelli '802, can only be used for vertically moving batches.

Similarly, U.S. Pat. No. 4,077,467 to Spigarelli discloses a method and apparatus for drawing a workpiece through a plurality of substantially vertically aligned confined regions of saturated vapors. The workpiece is initially heated in a primary vapor region and is sequentially raised through upper vapor regions. Vapors escaping from lower regions into the upper regions are condensed in the upper regions and are returned to a lower region fluid reservoir. Horizontal batch or continuous flow-through operation is not possible.

SUMMARY OF THE INVENTION

The present invention presents a vapor phase processing system for heating a workpiece such as a circuit board to a preselected temperature, such as a temperature above the melting point of solder on the circuit board. The vapor phase processing system includes a vessel having a processing chamber containing a two-phase processing fluid which has a heavier-than-air vapor phase. Heating means such as a heating coil is disposed adjacent the bottom of the chamber for bringing the processing fluid to a boil. A condensing coil is disposed within the chamber, spacially dividing the chamber into an upper substantially vapor free zone, an intermediate substantially vapor saturated zone, and a lower liquid zone. The housing is arranged to have a covered inlet tunnel and a cover outlet tunnel in communication with the processing chamber in horizontal alignment with the upper vapor free zone.

A conveyor for moving workpieces such as flat circuit boards situated on horizontal pallets down into, through and up out of the intermediate vapor saturated zone includes two sets of parallel track means, a first track means supporting a front end portion of such pallet and a second track means supporting a rear end portion thereof. Downward sections of each set of track means are parallel with the downward sections of the other set; and upward sections of each set of track means are parallel with upward sections of the other set. These mutually parallel sections are spaced apart by the distance the front and reach pallet supports are spaced apart. Thus, the workpieces on the pallets are maintained in a substantially horizontal orientation during their conveyance through the processing chamber.

The inlet tunnel and the outlet tunnel extend away from the processing chamber in substantially horizontal but slightly upwardly extending direction so that any of the vapor phase of the processing liquid condensing on the walls or floor of the tunnels will find its way back through the tunnels and into the processing chamber where it will be subject to being once again reheated into its vapor phase.

A scavenger system including suction lines open through the floor of each of the tunnels at outer end portions thereof draws any vaporized processing fluid which exists in the tunnels, along with atmospheric air from outside of the tunnels, down into an auxiliary tank where a second cooling coil causes it to be condensed and collected at the bottom of the auxiliary tank while the then purified atmospheric air is discharged from the auxiliary tank by an air flow inducing means such as a blower.

BRIEF DESCRIPTION OF THE DRAWINGS

FIG. 1 is a perspective view of a portion of the vapor phase processing system of the present invention with parts removed and parts in section, illustrating a vessel having a processing chamber in communication with the atmosphere through inlet and outlet tunnels, a cooling coil disposed within the chamber defining an upper limit of a vapor processing zone below the inlet and outlet tunnels, and a conveyor assembly for horizontally transporting a workpiece on a pallet from the inlet tunnel, down through the chamber for processing and up to the outlet tunnel;

FIG. 2 is a longitudinal cross sectional view of the vessel of FIG. 1 illustrating workpieces being conveyed on a pallet through the chamber by the conveyor assembly;

FIG. 3 is an enlarged perspective view of a first crossover portion of first and second rails forming part of a conveyor assembly of the present invention, as identified in Circle III in FIG. 1;

FIG. 4 is an enlarged perspective view of a second crossover portion of the first and second rails, identified in Circle IV in FIG. 1;

FIG. 6 is an enlarged cross sectional view of a portion of the conveyor assembly, taken along the line 6—6 of FIG. 2.

DETAILED DESCRIPTION OF THE PREFERRED EMBODIMENT

Figure 5:
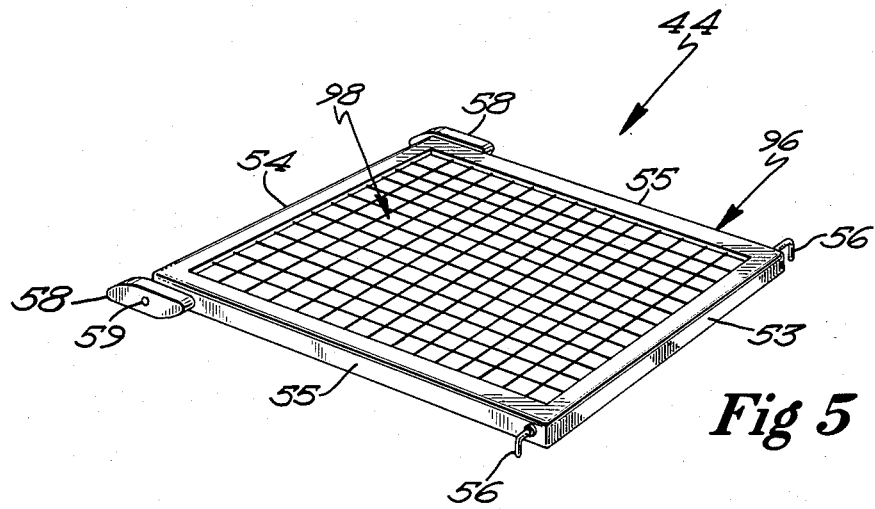
FIG. 5 is a perspective view of a pallet or platform which carries workpieces through the chamber of the vessel along the conveyor assembly.

A vapor phase processing system 10 includes a vessel 12, a conveyor assembly 18 and a scavenger system 108. The vessel 12 is provided with a heating element 26 adjacent a bottom wall 32, a cooling coil 28 fastened by brackets 80 in fixed relationship with respect to intermediate portions of planar, mutually parallel end walls 64,64 and planar, mutually parallel side walls 62,62 of the vessel 12.

A top cover 66 is removably positioned over the top of vessel 12 to prevent any loss of vaporized treatment fluid out of the top of the vessel. Only a part of that cover 66 is shown in FIG. 1. It can be constructed with a suitable transparent window to permit observation of the soldering process as it proceeds. Otherwise, a side window can be provided at an appropriate location in one of the walls of the vessel in position in alignment with the vapor saturated zone 34 of the processing chamber 20.

These end walls, side walls, this top cover and this bottom wall of the vessel 12 defines a processing chamber 20 in which there is a processing, treatment or working fluid 13. This fluid is preferably extremely non-polar and has essentially no solvent action, is colorless, odorless, low in toxicity, and non-flammable. Preferably it has high thermal stability, low chemical reactivity, and leaves essentially no residue. The non-polar character of such a fluid can lead to physical properties such as slow heat of vaporization, low surface tension, and low boiling point in relation to its high molecular weight. A working fluid or processing fluid such as the completely fluorinated organic compounds sold under the trademark FLOURINERT by 3M Company and designated as FC-43; FC-70 or FC-71 have been found satisfactory for the purpose, these fluids having boiling points ranging from 170° C. to 253° C. A particular working fluid will be selected for a particular situation depending on factors including the makeup, and therefore, the remelt temperature of the solder which is to be present on the circuit board or other workpiece 16 which is to be processed.

With the processing fluid 13 in the processing chamber 20, with the heating element 26 activated to cause the fluid to boil, and with coolant such as water flowing through the spiral cooling coil 28, as the processing fluid boils and vaporizes, the chamber 20 becomes spacially divided into a lower liquid zone 30, an intermediate vapor saturated zone 34 and an upper substantially vapor free zone 36. The level of the cooling coil 28 defines an upper limit of the vapor saturated zone 34. A covered inlet preheat tunnel 22 extends generally horizontally outwardly from an inlet opening 70 provided in one of the end walls 64 of the vessel 12 to the left as seen in FIG. 1. Likewise, a covered outlet cooling tunnel 24 extends outwardly from an outlet opening 76 provided in the other end wall 64 of the vessel 12 to the right as seen in FIGS. 1 and 2.

Figure 7:
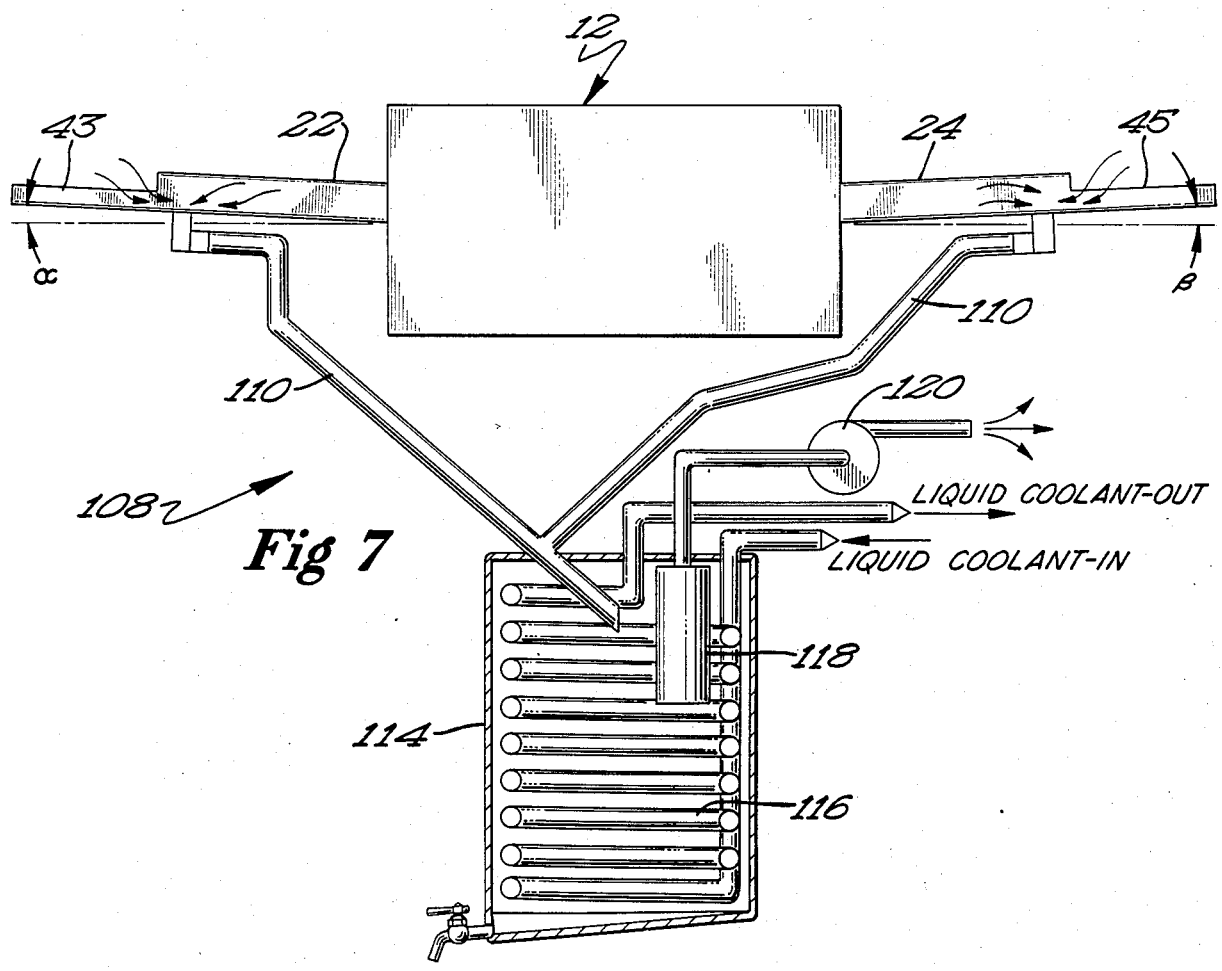
FIG. 7 is a schematic representation of the vapor phase processing system of the present invention, including a vapor scavenger system which recovers vapor which would otherwise escape from the chamber of the vessel into the atmosphere.

While inlet preheat tunnel 22 and outlet cooling tunnel 24 extend generally horizontally away from the vessel 12, each is at a slight angle with respect to the horizontal to allow any of the vapor phase of the working fluid which condenses to liquid phase in those tunnels to run back down into the vessel 20. As best seen in FIG. 7, the angles $\alpha$ and $\beta$ by which the inlet tunnel 22 and the outlet tunnel 24 deviate from the horizontal, respectively, it is preferably small enough so that any deviation of circuit boards or other workpieces 16 from the horizontal while traveling into the vessel 12 through the preheating tunnel 22 or while traveling from the vessel 12 through the cooling tunnel 24 will not affect the quality of the final product. An angle of approximately 3° above horizontal has been found to be satisfactory for both the $\alpha$ and $\beta$ angles.

The conveyor assembly 18 includes a first pair or set of mutually parallel support rails or tracks 38,38, a second pair or set of mutually parallel support rails or tracks 40,40, a pair of drive chains 42, and a pallet or platform 44. The first pair of rails 38 are disposed within the vessel 12 in alignment with inlet tunnel 22 and outlet tunnel 24. The second pair of rails 40 are also aligned with the tunnels 22 and 24, and each are disposed in adjacent relation to one of the first pair of rails 38 and between the first pair of rails.

Horizontal counterpart rails 39 and 41 extend integrally away from rails 38 and 40, respectively, outwardly from the vessel 12 in both directions, through the closed tunnels 22 and 24 and outwardly along an open inlet rail support channel 43 and an open outlet rail support channel 45. See FIG. 7. For clarity of illustration, these counterpart rails 39 and 41 have been omitted from most of the drawings; but they show clearly in the upper left-hand corner of FIG. 1.

The first pair of rails 38,38 are mirror images of each other, and include V-shape sections 46,46 which extend from position in the upper vapor free zone 36 down into the vapor saturated zone 34 and back into the upper vapor free zone 36. The second pair of rails 40,40 are also mirror images of each other, and include V-shaped sections 48,48 which also extend from the vapor free zone 36 down into the vapor saturated zone 34 and back up into the vapor free zone 36 in horizontally spaced but parallel relationship to the corresponding parts of the V-shape sections 46 of the first set of rails.

V-shape sections 46,46 include descent legs 49,49 and ascent or return legs 50,50. The V-shape sections 48 includes descent legs 51,51 and ascent or return legs 52,52, each being parallel with its counterpart leg of section 46.

The drive chains 42 extend along the first set of rails 38,38 and along substantially parallel counterpart rails 39 to drive sprockets and idler sprockets (not shown) and eventually each chain 42 can connect back to itself to form an endless conveyor chain. These chains are driven for mutual simultaneous movement along the rails in any usual or preferred manner (not shown) forming no part of this invention per se.

The pallet or platform 44 includes a substantially rectangular frame 96 preferably constructed of stainless steel tubing which has been sandblasted. A woven teflon-impregnated fiberglass mesh 98 is mounted on the pallet frame 96 and supports the circuit boards or other workpieces 16 during their processing through the structure of the invention. The woven fiberglass mesh 98 is fluid permeable so that when the pallet and its workpieces are in the vapor saturated zone, the vapor can readily access the workpiece to bring it up to and past the melting temperature of the solder thereon as the pallet is moved through the vapor saturated zone 34 in the processing chamber 20.

The pallet 44 defines a leading edge 53, a trailing edge 54, and side edges 55,55. Extending outwardly from the leading edge 53 on each side, are a pair of leading chain link engaging and pallet supporting pins 56,56. Chain link engaging pins 56,56 engage precisely positioned individual links of the chains 42 as those links move in synchronous relationship with respect to each other along the first set of rails 38,38.

Extending outwardly from the trailing edge 54 are a pair of trailing pallet supporting skids of shoes 58,58. The trailing skids 58,58 are pivotably mounted with respect to the trailing edge 54 of the pallet 44 on skid shafts 59,59 and are positioned to move along the second pair of rails 40,40 to support the trailing edge 54 of the pallet as the chain links of the chain 42, acting through the pallet supporting chain link engaging pins 56, move the pallet along the rest of the conveyor assembly 18.

The distance between the connection points of the engaging pins 56,56 and of the skid shafts 59,59 with the pallet 44 is precisely equal to the distance between the corresponding points along the V-shape sections 46 and 48 of the first rails 38 and second rails 40, respectively, when measured on any horizontal plane passing through those sections. This assures that the leading edge 53 and the trailing edge 54 of the pallet 44 are maintained in horizontal alignment with each other as the pallet 44 is drawn along the V-shape sections of the first set of rails 38 and the second set of rails 40.

In operation, the circuit boards 16 or other workpieces will be situated with the soldered portions to be melted or reflowed facing upwards on a pallet 44 when it is supported by horizontal counterpart rails 39 and 41 and before it enters the closed inlet tunnel 22. If desired, means can be provided to heat the workpieces as they pass through the inlet preheat tunnel 22. As the pallet 44 enters the vessel 12, its progress is in a horizontal plane until the chain 42 and the leading pallet supporting chain link engaging pins 56,56 reach a first crossover portion of the rails identified in Circle III and as clearly illustrated in FIG. 3. At that point, each chain 42 is forced down into the V-section 46 by the presence of a V-shape tracking rail 94 which is parallel to and spaced above the V-shape section 46 of the first set of rails 38. In order to accomplish downward movement of the leading edge 53 of the pallet, a break or first cutaway portion 86 is provided through the second rails 40,40 to allow passage of the pallet supporting chain link engaging pins 56,56. As the leading edge 53 of the pallet 44 proceeds downwardly along descent legs 49,49 of the V-shape sections 46 of rails 38,38 to position as seen in FIG. 2, for example, the pallet supporting skids 58,58, acting through the skid shafts 59,59 will be supporting the trailing edge 54 of the pallet in horizontal relationship to the leading edge. Therefore, the workpieces 16 and 16 will be supported on a woven mesh 98 in precisely horizontal alignment at all times.

When the chain link engaging pins 56,56 reach the bottom of the V-shape sections 46 of the first set of rails 38, the trailing skids or shoes 58,58 and their skid shafts 59,59 will be positioned as seen in dotted lines in FIG. 2 at the bottom of the V-shape section 48 of the second set of rails 40,40.

From that point, the leading pallet supporting pins 56,56 will be carried up the ascent legs 50,50 along with the chain 42. To allow the pins 56,56 to pass through the second set of rails 40,40, a second break or cutaway portion 90 is provided in the second rails 40,40. The location of this break is identified in FIG. 1 by Circle IV, and is shown in detail in FIG. 4.

At the time that leading chain link engaging pins 56,56 are passing through the breaks 90 in the second set of rails 40,40, the trailing skids or shoes 58,58 will be traversing the first break or cutaway portion 86 of these rails 40,40 to smoothly support the trailing edge 54 of the pallet 44 in horizontal relationship with respect to the leading edge 53 thereof.

In order to insure such smooth passage, each shoe 58 has a lower plane skid support surface extending forwardly and extending rearwardly of its skid shaft 49. See FIGS. 1, 2 and 5. As clearly seen in FIG. 2 (in the top center portion at that figure), the leading forward edge of the lower plane surface of the shoe 58 (seen in dotted lines) is firmly in contact with, and supported by, the front portion of track or contact with, and supported by, the front portion of track or rail 40 which is across the break 86 from the back portion of the track before the skid shaft 59 loses its support from that back portion of the track 40. As the shoe moves forward, the skid shaft 59 is firmly supported on the other side of the gap or cutaway portion 86 before the trailing portion of the shoe 58 leaves the back side of the gap.

As the pallet proceeds into the cooling tunnel 24, these trailing shoes 58,58 will be smoothly traversing the second break or cutaway portions 90,90 of the second set of rails 40,40 to maintain the substantial horizontal alignment of the pallet 44 and of the work pieces 16 on it.

In order to insure that chains 42 ride smoothly into position under V-shape tracking rails 94,94, guide panels 92,92 are provided to insure precise longitudinal alignment of the chain with the support rails 38,38 and the tracking rails 94,94.

In order to position the first and second sets of rails 38,38 and 40,40 with respect to end walls 64,64 of the vessel 12, mounting flanges 82 are provided. By bolting these flanges to the walls 64,64, the proper positioning of the first and second rail sets can be easily accomplished. To provide for good transverse stability, angle iron braces 84 are provided to exactly position mutually parallel V-shape sections 46,46 with respect to each other and to position mutually parallel V-shape sections 48,48 with respect to each other.

Referring now to FIG. 7, the vessel 12, covered inlet tunnel 22, covered outlet tunnel 24, open inlet rail support channel 43 and open outlet rail support channel 45 are shown schematically as are the rest of the elements in the scavenger system 108. These elements include suction lines 110 which are open through the bottom floor of the tunnels 22 and 24 at positions adjacent outer end portions thereof to a position inside of a sealed auxiliary tank 114. Tank 114 is lined with a second cooling coil 116 through which liquid coolant such as water is circulated by any usual or preferred circulating means (not shown). Any vapor phase of the working liquid which reaches the inside of the closed tunnels 22 and 24 is "sucked" down into the auxiliary tank 114 along with atmospheric air entering through the open rail support channels 43 and 45 through the instrumentality of an exhaust blower 120, acting through an air filter 118.

The cooling coil 116 and the liquid coolant therein keeps the temperature inside of tank 114 at substantially less than the boiling point of the treatment fluid, so that any of the vapor phase of that fluid which arrives in the auxiliary tank 114 instantly condenses to liquid phase and falls to the bottom of that tank. The thus purified air then passes through the air filter 118 and through blower 120 and harmlessly into the atmosphere. This liquid phase treatment fluid can be drawn off in any usual or preferred manner and can be reused.

Vessel 12, the rail assembly 18, the leading chain link engaging pins 56,56, the railing skids or shoes 58,58 and the skid shafts 59,59 are preferably constructed of stainless steel.

Although the present invention has been described with reference to preferred embodiments, workers skilled in the art will recognize that changes may be made in form and detail without departing from the spirit and scope of the invention.

What is claimed is:

1. A conveyor assembly for maintaining workpieces in a horizontal orientation while conveying them along a non-horizontal linear path; said assembly including:

A. a first pair of spaced-apart, mutually parallel rails defining a first non-horizontal linear path;
B. a second path of spaced-apart, mutually parallel rails, each rail located between the first pair of rails and in relatively closely adjacent relation to one of the rails of the first pair;
C. a horizontal platform receiving and supporting workpieces, said horizontal platform being configured to extend between the rails of the second pair;
D. a pair of leading platform support pins, each extending from one of two transversely aligned first forward points on said platform into operational travelling relationship with respect to one of said rails of said first pair;
E. a pair of elongated trailing platform support shoes each partially defined by a lowermost plane skid support surface, each shoe being pivotably mounted at an intermediate portion thereof on its own skid shaft to one of two transversely aligned second rearward points on said platform and each shoe being in operative sliding relation to one of said rails of said second pair;
F. said second pair of rails defining a second non-linear path which is at all points in parallel relation to said first path defined by said first pair of rails and at a distance behind the first path equal to the distance between the first forward support pin mounting points and the second rearward shoe mounting pivot points on the platform;
G. each rail of said second pair of rails being provided with a break therein at each point the first path crosses the second path, each break being only long enough to effectively accommodate passage of a leading platform support pin;
H. the length of the skid support surface forwardly of and rearwardly of its skid shaft in relation to the length of each break in its rail being such that a forward portion of the skid support surface will be in firm supported contact with a front portion of its rail adjacent the break before the skid shaft loses its support from the back portion of said rail adjacent the break, and such that the skid shaft is firmly supported on the forward portion of the rail before a rearward portion of the skid support shaft leaves supported relation with the back portion of the rail; and
I. means to move the platform along the first and second pairs of rails.

2. The conveyor assembly of claim 1 wherein:

J. said means for moving the platform along the rails includes a pair of flexible chains each adapted to slide along one of the first set of rails, and tracking means associated with each non-horizontal portion of the first rails to force the chains to follow the path defined by the first rails; and
K. said leading platform support pins are so constituted at outer ends thereof that they are each transported simultaneously by precisely mutually transversely aligned portions of one of the chains.

* * * * *